(12) United States Patent
Naito

(10) Patent No.: US 9,940,173 B2
(45) Date of Patent: Apr. 10, 2018

(54) SYSTEM, MANAGEMENT DEVICE AND METHOD OF CONTROLLING A PLURALITY OF COMPUTERS

(71) Applicant: FUJITSU LIMITED, Kawasaki-shi, Kanagawa (JP)

(72) Inventor: Toshiya Naito, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 227 days.

(21) Appl. No.: 15/089,820

(22) Filed: Apr. 4, 2016

(65) Prior Publication Data
US 2016/0314019 A1 Oct. 27, 2016

(30) Foreign Application Priority Data
Apr. 27, 2015 (JP) ................................. 2015-090520

(51) Int. Cl.
G06F 9/46 (2006.01)
G06F 9/50 (2006.01)
G06F 9/445 (2018.01)

(52) U.S. Cl.
CPC ............ *G06F 9/5066* (2013.01); *G06F 9/445* (2013.01); *G06F 2209/5017* (2013.01)

(58) Field of Classification Search
None
See application file for complete search history.

(56) References Cited

U.S. PATENT DOCUMENTS

| 5,838,976 A * | 11/1998 | Summers | G06F 11/3466 |
| | | | 714/E11.2 |
| 2004/0003372 A1 * | 1/2004 | Sato | G06F 8/34 |
| | | | 717/109 |
| 2009/0240927 A1 * | 9/2009 | Yoshida | G06F 9/30021 |
| | | | 712/222 |
| 2010/0153959 A1 * | 6/2010 | Song | G06F 9/485 |
| | | | 718/104 |
| 2013/0024871 A1 * | 1/2013 | Gao | G06F 9/485 |
| | | | 718/105 |
| 2013/0246852 A1 * | 9/2013 | Osada | G06F 11/2236 |
| | | | 714/33 |
| 2015/0128144 A1 * | 5/2015 | Mansell | G06F 9/50 |
| | | | 718/104 |

FOREIGN PATENT DOCUMENTS

| JP | 9-237203 | 9/1997 |
| JP | 2004-272582 | 9/2004 |
| JP | 2011-180725 | 9/2011 |

* cited by examiner

*Primary Examiner* — Dong Kim
(74) *Attorney, Agent, or Firm* — Staas & Halsey LLP

(57) ABSTRACT

A system includes a plurality of computers configured to process a computer program in parallel by executing a plurality of processes, respectively, in parallel, each process of the plurality of processes including at least one thread, and each of the plurality of computers including a first memory and a first processor coupled to the first memory and configured to execute the plurality of processes, respectively, and a management device configured to control the plurality of computers, the control device including a second memory, and a second processor coupled to the second memory, and based on parallelization rate, memory busy rate, operation number difference and processing time difference, execute an adjusting of a number of the threads included in at least one process of the plurality of processes.

15 Claims, 13 Drawing Sheets

FIG. 7

| ITEM \ PROCESS NUMBER | 0 | 1 | 2 | 3 |
|---|---|---|---|---|
| PARALLELIZATION RATE (%) | 92 | | | |
| MEMORY BUSY RATE (%) | 4 | | | |
| NUMBER OF FLOATING-POINT OPERATIONS | 1.19E+10 | 2.46E+10 | 3.51E+10 | 2.19E+10 |
| PROCESSING TIME (s) | 22 | 48 | 70 | 44 |

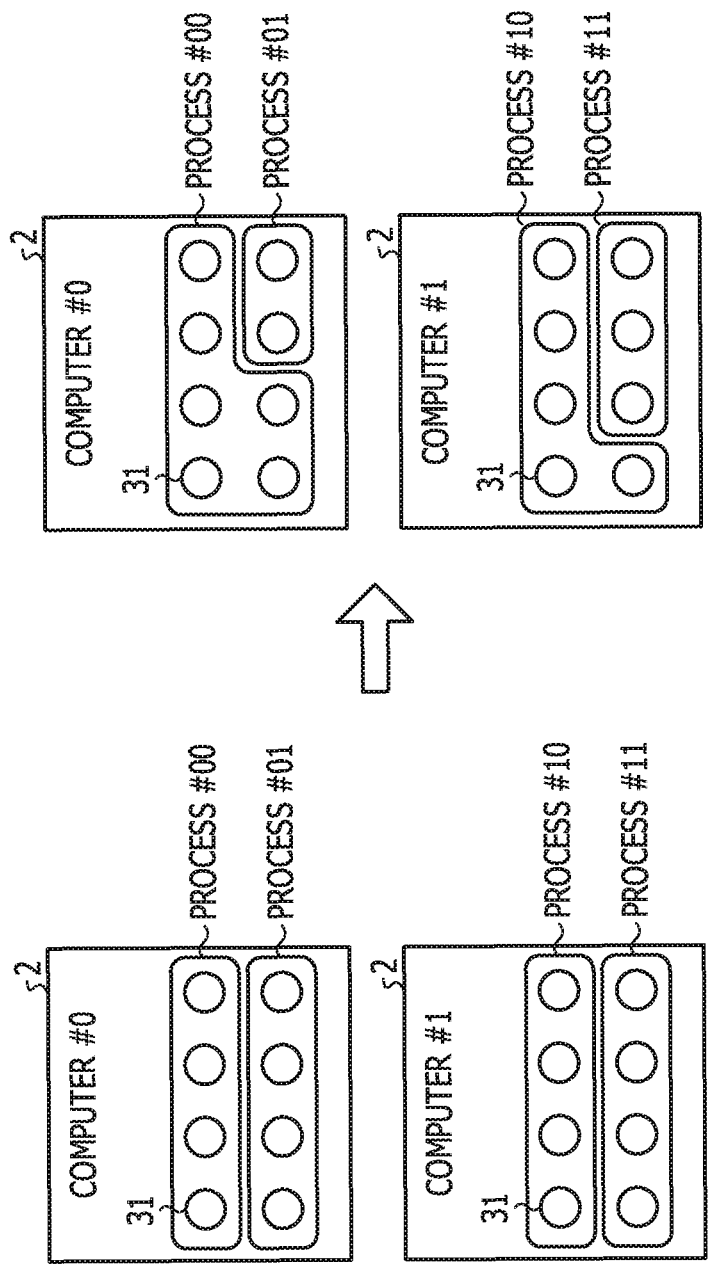

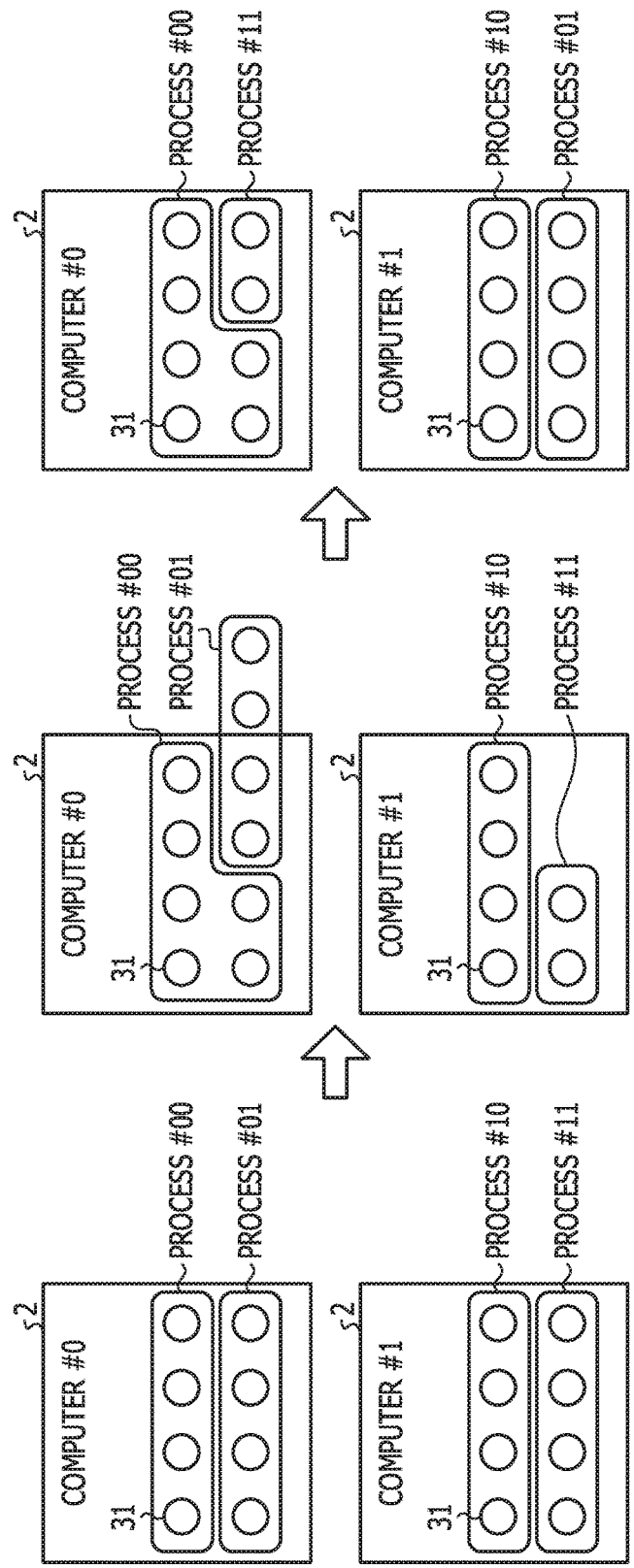

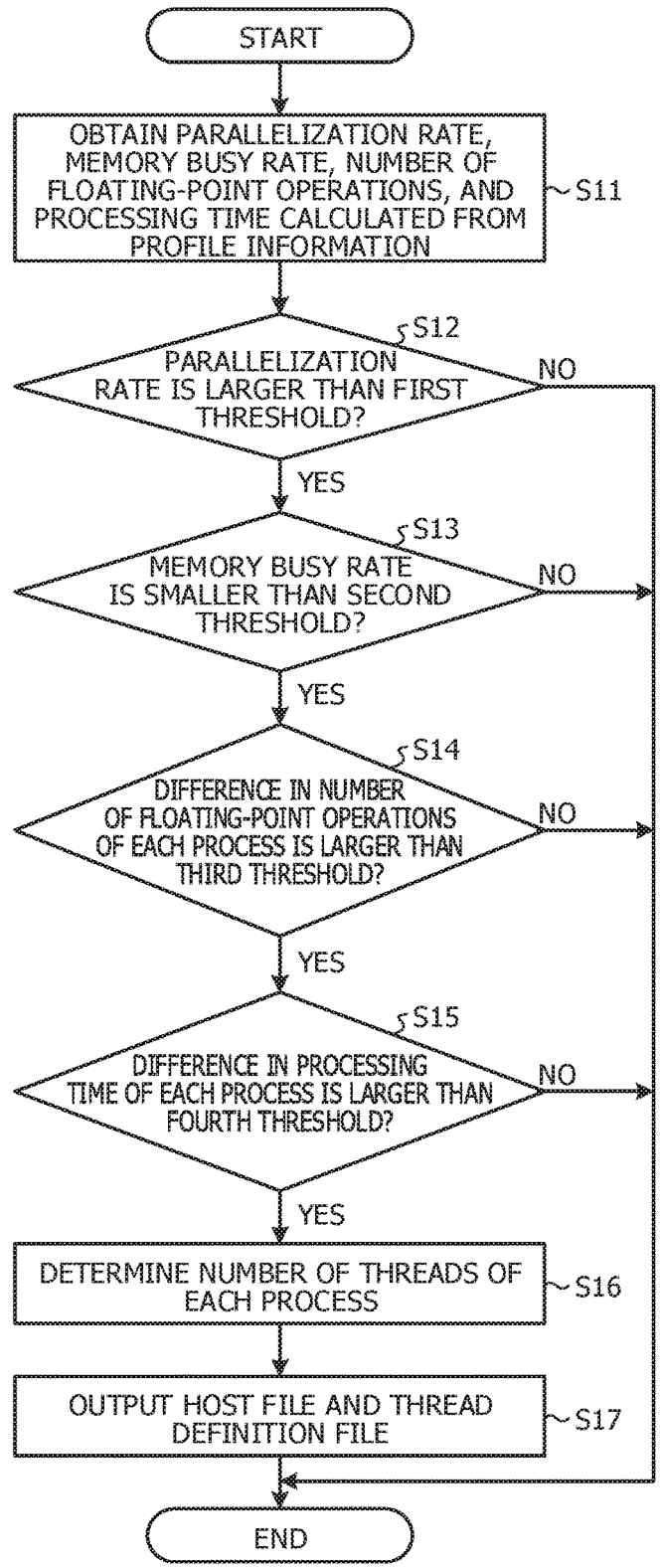

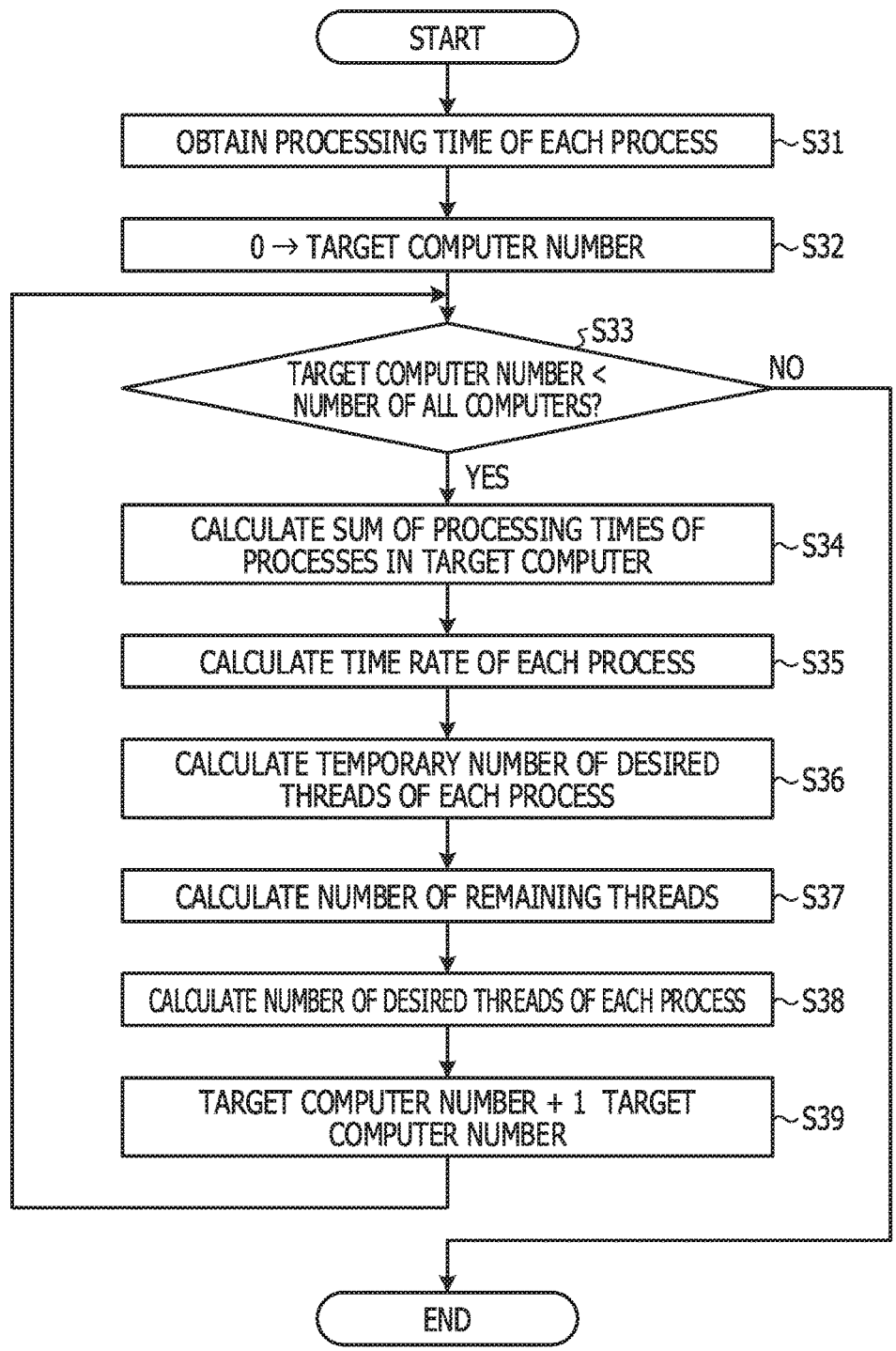

SYSTEM, MANAGEMENT DEVICE AND METHOD OF CONTROLLING A PLURALITY OF COMPUTERS

CROSS-REFERENCE TO RELATED APPLICATION

This application is based upon and claims the benefit of priority of the prior Japanese Patent Application No. 2015-090520, filed on Apr. 27, 2015, the entire contents of which are incorporated herein by reference.

FIELD

The embodiment discussed herein is related to a system, a management device and a method of controlling a plurality of computers.

BACKGROUND

A parallel computer including a plurality of computers performs parallel processing of a program by executing a plurality of processes in parallel. Here, the process is a unit of parallel processing. Each computer includes a plurality of central processing unit (CPU) cores, and, in each computer, one or more processes are executed in parallel. Communication between processes is performed using message passing interface (MPI).

Each process is executed partially with a plurality of threads. For example, when a loop that is repeatedly executed with a loop variable I being varied from 1 to 1000 is contained in a program and the number of threads is four, processing is performed in parallel by using four threads of I=1 to 250, I=251 to 500, I=501 to 750, and I=751 to 1000. One CPU core is assigned to one thread.

The number of processors and the number of threads may be specified by the user of a parallel computer. However, the number of threads falls within the number of CPU cores. In addition, parallel processing performed by a plurality of processes each of which one or more threads are assigned to is referred to as hybrid parallel processing.

In order to efficiently perform parallel processing, it is important to make the processing times of all the processes the same. The processing time of a process is dependent on the number of threads. There is known a technique in which, in each process, the number of threads of the process is dynamically set again based on the processing time, and thereby the processing times of all the processes are made the same.

There is also known a technique in which the performance values of a computer system are estimated by performing a simulation based on a series of component program sequences executed, the timings at which they are executed, and the performance values of the component programs, and thus the design of a computer system that satisfies the desired performance is supported.

There is also known a technique in which each thread stores a measured performance metric in its corresponding region and a region corresponding to the parent thread of memory, and, when the process is complete, a profiler scans through the memory and sums the performance metrics, enabling the performance metrics to be analyzed at the thread or process level.

Japanese Laid-open Patent Publication No. 2011-180725, Japanese Laid-open Patent Publication No. 2004-272582, and Japanese Laid-open Patent Publication No. 9-237203 are known as related art examples.

SUMMARY

According to an aspect of the invention, a system includes a plurality of computers configured to process a computer program in parallel by executing a plurality of processes, respectively, in parallel, each process of the plurality of processes including at least one thread, and each of the plurality of computers including a first memory and a first processor coupled to the first memory and configured to execute the plurality of processes, respectively, and a management device configured to control the plurality of computers, the control device including a second memory, and a second processor coupled to the second memory and configured to calculate a parallelization rate indicating a level of thread parallelization when the plurality of processes are executed in parallel by the plurality of computers, respectively, calculate a memory busy rate indicating a percentage of an amount of time during which the first memory of each of the plurality of computers is used when the plurality of processes are executed in parallel by the plurality of computers, respectively, calculate an operation number difference indicating a difference in a number of floating-point operations of each process of the plurality of processes, calculate a processing time difference indicating a difference in processing time in each process of the plurality of processes, and based on the calculated parallelization rate, the calculated memory busy rate, the calculated operation number difference and the calculated processing time difference, execute an adjusting of a number of the threads included in at least one process of the plurality of processes, respectively.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 depicts an example of information calculated from profile information;

FIG. 9A illustrates an example in which processes that are assigned to computers are not changed;

FIG. 9B illustrates an example in which processes that are assigned to computers are changed;

FIG. 10 is a flowchart illustrating a flow of processing of the reassignment program;

FIG. 12 is a flowchart illustrating a flow of a thread number determination process performed by a second determination unit.

DESCRIPTION OF EMBODIMENT

By changing the numbers of threads assigned to processes, it is made possible to make the processing times of the processes the same. However, in some cases, even when the numbers of threads are changed, the processing time of the program is not reduced. Therefore, in terms of reduction in processing time of a program, it is ineffective in some cases to change the numbers of threads. For example, for the cases where there are few portions that are processed in parallel by a plurality of threads, even if the numbers of threads are changed, the processing time of the program is negligibly reduced.

Hereinafter, an embodiment of a parallel computer, a thread reassignment determination method, and a thread reassignment determination program disclosed in the present application will be described in detail with reference to drawings. It is to be noted that this embodiment is not intended to limit the techniques of the disclosure.

Figure 1:
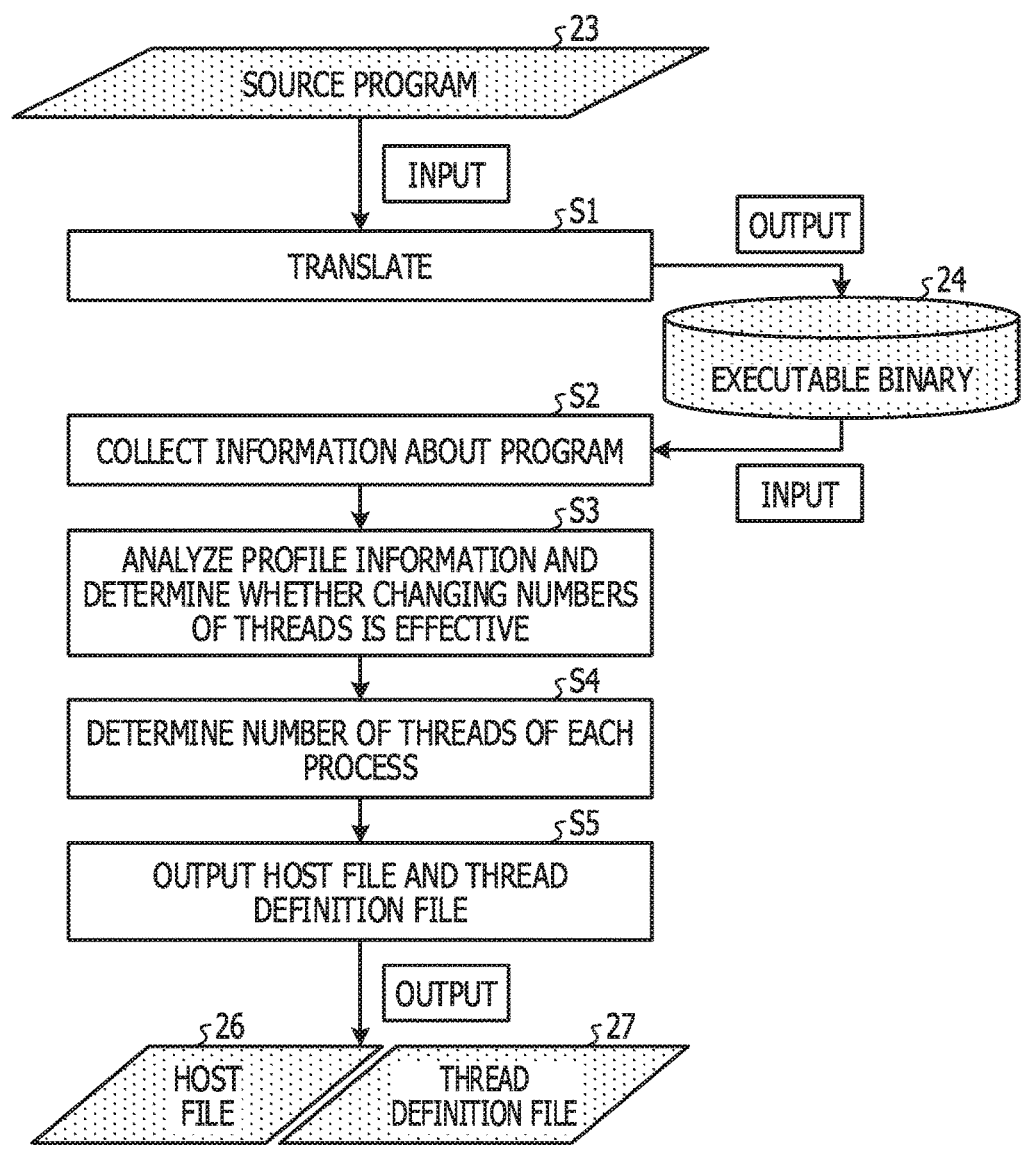
FIG. 1 illustrates a flow of a thread number changing process performed by a parallel computer according to an embodiment.

First, the flow of a thread number changing process performed by a parallel computer according to the embodiment will be described. FIG. 1 illustrates a flow of the thread number changing process performed by the parallel computer according to the embodiment. As illustrated in FIG. 1, the parallel computer according to the embodiment receives input of a source program 23, translates it, and outputs an executable binary 24 (step S1).

The parallel computer then receives input of the executable binary 24 and collects information about a program (step S2). Then, the parallel computer analyzes the collected information, that is, profile information and determines whether or not changing the numbers of threads that are assigned to processes is effective (step S3).

If the parallel computer determines that changing the numbers of threads that are assigned to processes is effective (step S4), the parallel computer determines the number of threads of each process, (step S4) and outputs a host file 26 and a definition file 27 (step S5).

Here, the host file 26 is a file that is used when processes are assigned to computers. When the host file 26 is not used, processes are assigned to computers according to the assignment policy of the parallel computer. The thread definition file 27 is a file that is used when the number of threads is specified for each process and assignment of threads to CPU cores is specified. When the thread definition file 27 is not used, the number of threads of each process has a value specified by the user, and the threads are assigned to the CPU cores according to the assignment policy of the parallel computer.

In this way, the parallel computer according to the embodiment analyzes profile information, determines whether or not changing the numbers of threads that are assigned to processes is effective, and changes the numbers of threads that are assigned to processes if it is determined that changing the number of threads is effective. Accordingly, with the parallel computer according to the embodiment, the numbers of threads that are assigned to processes are not ineffectively changed.

In addition, as the numbers of threads are changed, the parallel computer according to the embodiment changes processes that are assigned to computers and changes threads that are assigned to CPU cores, if desired. Accordingly, the parallel computer according to the embodiment performs thread assignment suitable for changes in the numbers of threads.

Figure 2:
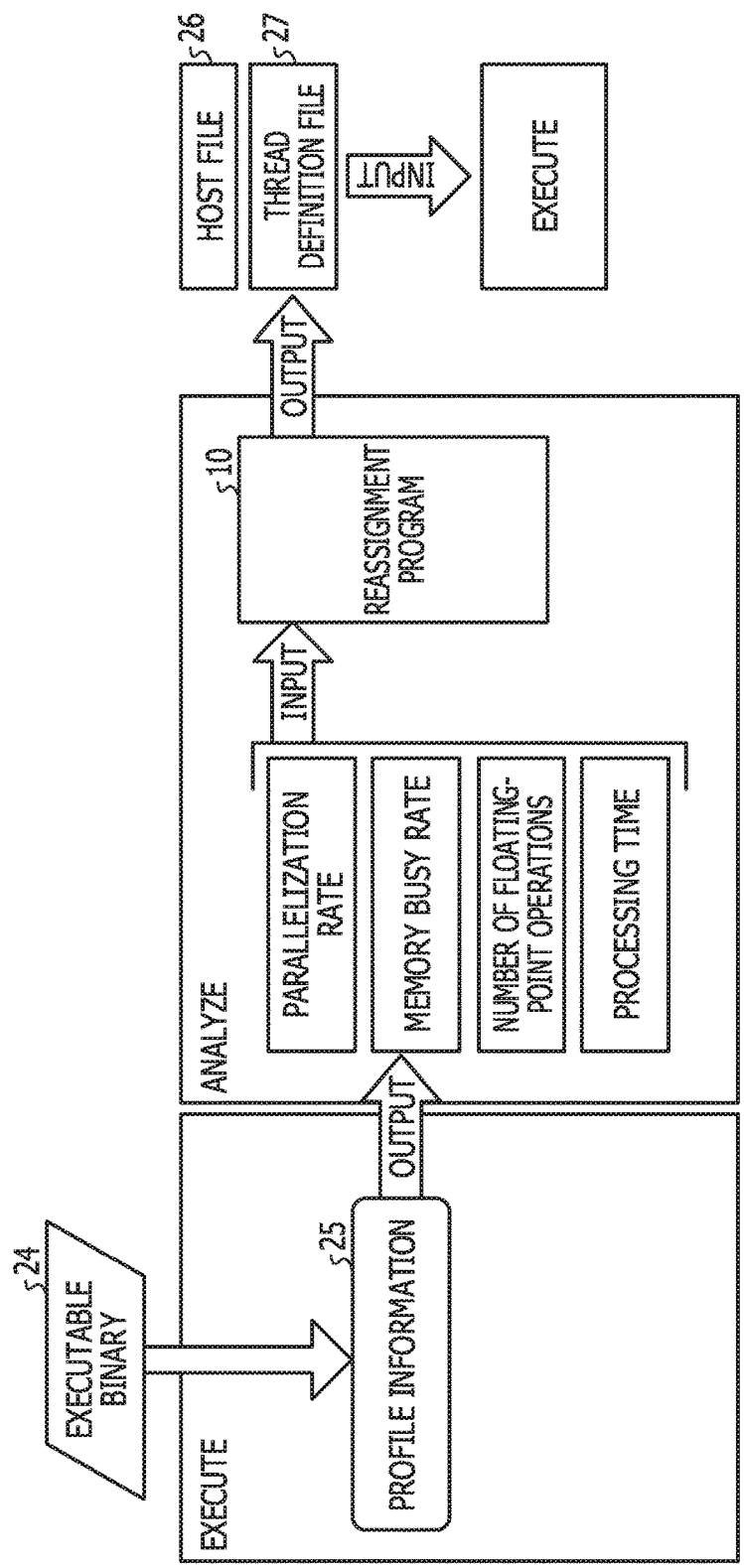
FIG. 2 is a diagram for explaining a method for determining whether or not changing the numbers of threads that are assigned to processes is effective.

Next, a method for determining whether or not changing the numbers of threads that are assigned to processes is effective will be described. FIG. 2 is a diagram for explaining a method for determining whether or not changing the numbers of threads that are assigned to processes is effective.

As illustrated in FIG. 2, the parallel computer according to the embodiment executes the executable binary 24 to collect profile information 25. Further, the parallel computer according to the embodiment calculates a parallelization rate, a memory busy rate, the number of floating-point operations of each process, and the processing time of each process from the profile information 25.

Here, the parallelization rate is a rate at which threads perform processing in parallel. If portions that are processed in parallel by threads do not account for a high proportion of a program, changing the numbers of threads has no effect. The parallelization rate is therefore used to determine whether or not changing the numbers of threads is effective.

The parallelization rate is defined by the following formula. The parallelization rate is given as a percentage (%).

The parallelization rate=100×the total amount of time spent for parallel processing in all threads/ (the total amount of time spent for parallel processing in all threads+the amount of time spent for sequential processing in a master thread)

The amount of time spent for parallel processing in all threads is the amount of time spent for the portions for which a plurality of threads assigned to processes have performed processing in parallel. The amount of time spent for sequential processing in a master thread is the amount of time spent for portions for which only one thread, out of the plurality of threads assigned to the process, has performed processing.

Figure 3:
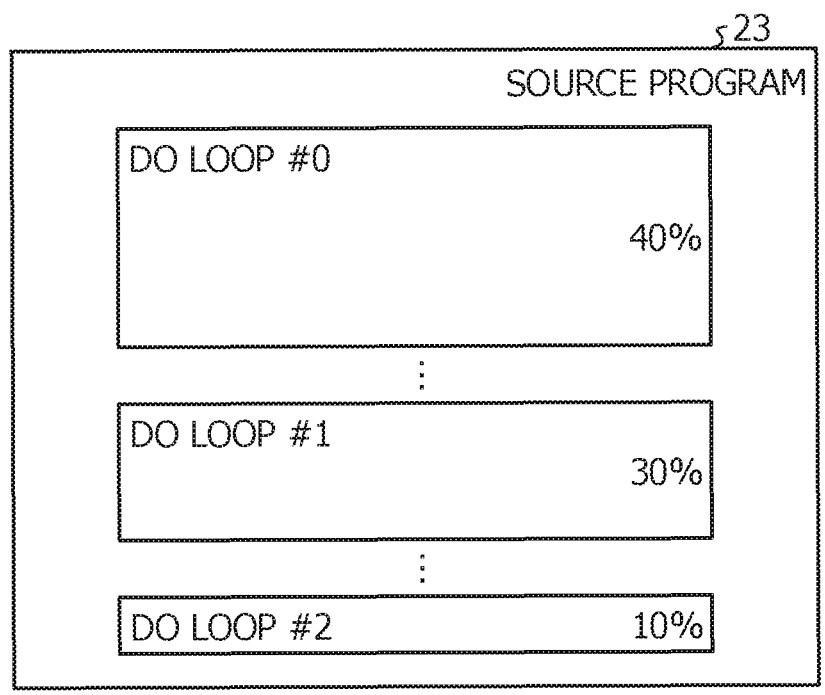
FIG. 3 is a diagram for explaining a parallelization rate.

FIG. 3 is a diagram for explaining a parallelization rate. In FIG. 3, portions of a do loop #0 to a do loop #2 of the source program 23 are portions for which processing has been performed in parallel by a plurality of threads, and the other portions are portions for which sequential processing has been performed by one thread. Assuming that the percentage of the amount of processing time of a portion to the total amount of processing time is 40% in the do loop #0, 30% in the do loop #1, and 10% in the do loop #2, the parallelization rate is 80%.

The memory busy rate is used to determine whether or not changing the numbers of threads is effective, in order to check that memory access is not bottlenecked. If memory access is bottlenecked, the bottleneck is a factor that determines processing time. In this case, even if the numbers of threads are changed, no effect is obtained.

The floating-point operation is a high-load operation. When there is no difference in the number of floating-point operations of each process, no effect is obtained even if the numbers of threads are changed. Therefore, the number of floating-point operations is used to determine whether or not changing the numbers of threads is effective.

When the processing times of processes are not equal, making the processing times the same reduces the entire processing time. Therefore, the processing time of each process is used to determine whether or not changing the number of threads is effective.

In the parallel computer according to the embodiment, a reassignment program 10 determines, based on the parallelization rate, the memory busy rate, the number of floating-point operations of each process, and the processing time of each process, whether or not changing the numbers of threads that are assigned to the processes is effective. Further, if the reassignment program 10 determines that the changing is effective, the reassignment program 10 outputs the host file 26 and the thread definition file 27 so as to adjust the numbers of the threads that are assigned to processes and the processes that are assigned to the computers.

Further, when executing the executable binary 24 next, the parallel computer according to the embodiment receives input of the host file 26 and the thread definition file 27 and performs the execution. Accordingly, the parallel computer according to the embodiment reduces the processing time of a program.

Figure 4:
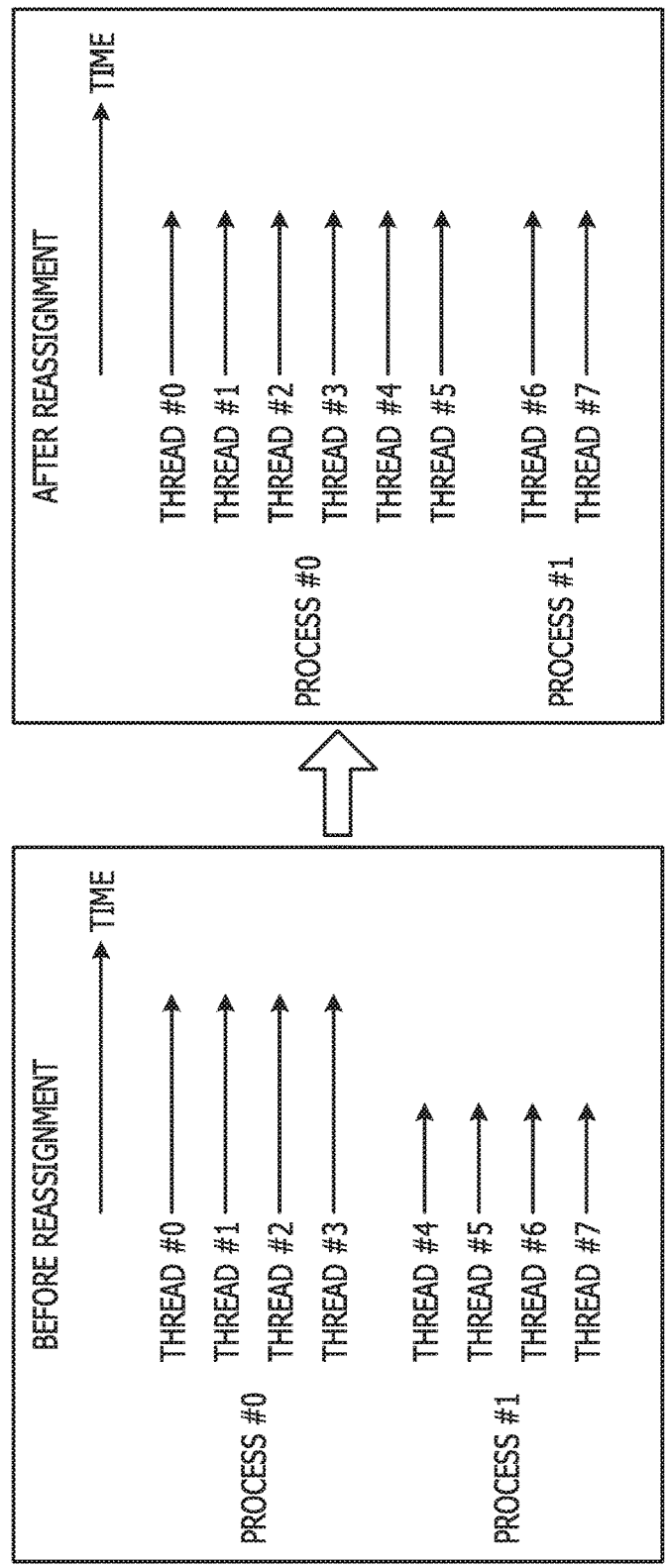
FIG. 4 illustrates an example of thread reassignment.

FIG. 4 illustrates an example of thread reassignment. In FIG. 4, the case where threads are reassigned to two processes, which are represented as a process #0 and a process #1, is illustrated. As illustrated in FIG. 4, before the reassignment, four threads are assigned to each of the process #0 and the process #1, and there is a difference in processing time between the process #0 and the process #1. In contrast, after the reassignment, six threads and two threads are assigned to the process #0 and the process #1, respectively, and the processing time for the process #0 and the processing time for the process #1 are made the same, resulting in a reduction in processing time.

Figure 5:
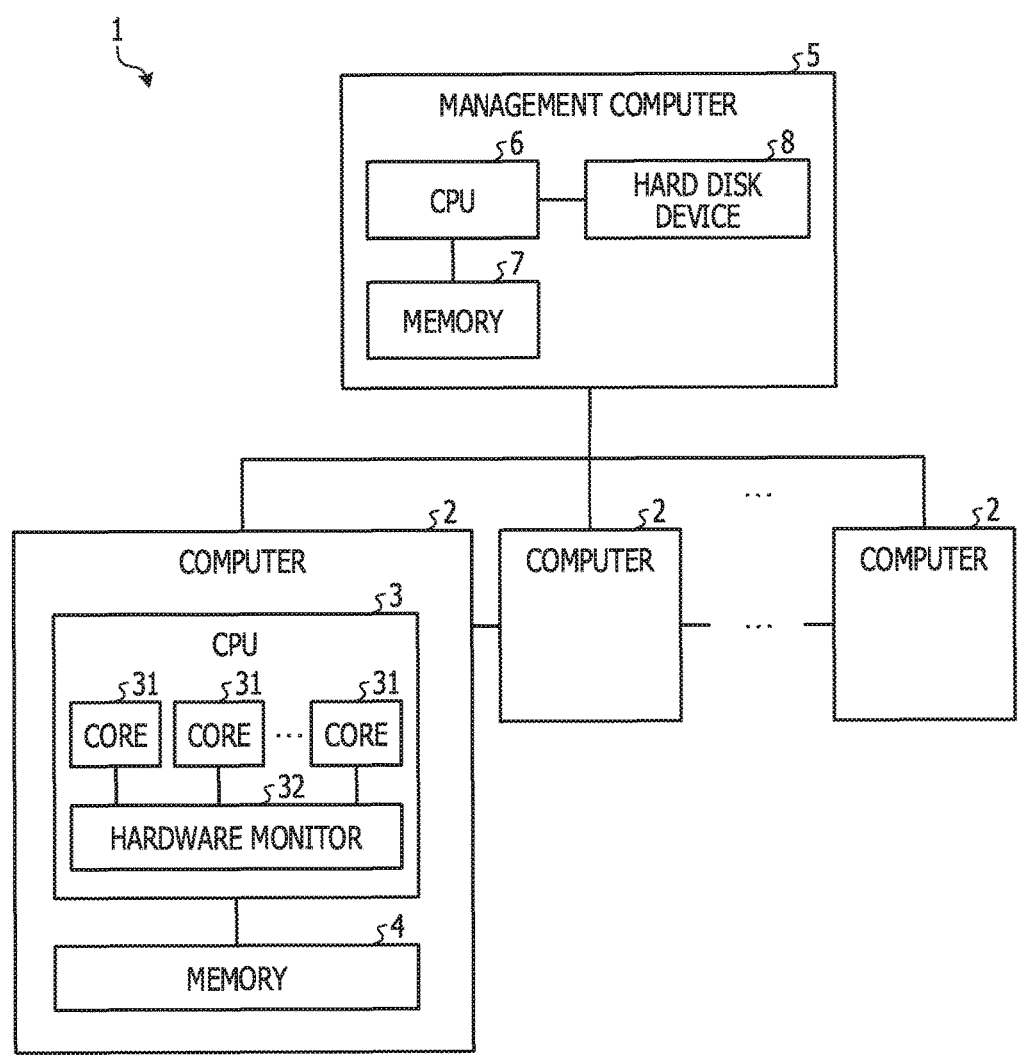
FIG. 5 illustrates a configuration of the parallel computer according to the embodiment.

Next, the configuration of the parallel computer according to the embodiment will be described. FIG. 5 illustrates the configuration of the parallel computer according to the embodiment. As illustrated in FIG. 5, a parallel computer 1 includes a plurality of computers 2 and a management computer 5. The computer 2 is a device that performs information processing. The management computer 5 is a computer that manages the plurality of computers 2 to manage execution of programs in the parallel computer 1.

The computer 2 includes a CPU 3 and a memory 4. The CPU 3 is a processing device that reads a program from the memory 4 and performs processing, and includes a plurality of cores 31 and a hardware monitor 32. The core 31 is a device that performs arithmetic processing, and is a CPU core that is assigned to a thread.

The hardware monitor 32 is a device that collects and accumulates information for calculating the memory busy rate and the number of floating-point operations. The memory 4 is a random access memory (RAM) that stores programs that are executed by the CPU 3, intermediate results of execution of the programs, and so on.

Note that although the case where the computer 2 includes one CPU 3 is described here for convenience of explanation, the computer 2 may include a plurality of CPUs 3.

The management computer 5 includes a CPU 6, a memory 7, and a hard disk device 8. The CPU 6 is a processing device that reads a program from the memory 7 and performs processing. The memory 7 is a RAM that stores programs that are executed on the CPU 6, intermediate results of execution of the programs, and so on.

Figure 6:
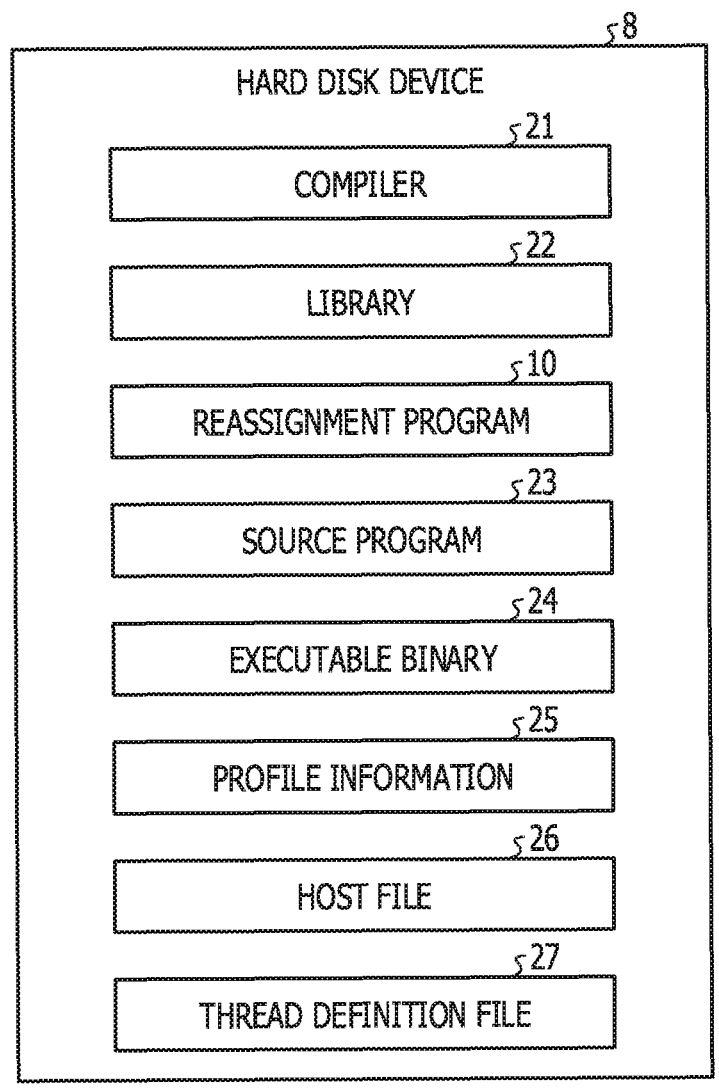
FIG. 6 illustrates programs and files stored in a hard disk device.

The hard disk device 8 is a magnetic storage device that stores programs that are executed on the parallel computer 1, files for use in the parallel computer 1, and so on. FIG. 6 illustrates programs and files stored in the hard disk device 8. As illustrated in FIG. 6, the hard disk device 8 includes a compiler 21, a library 22, the reassignment program 10, a source program 23, an executable binary 24, profile information 25, a host file 26, and a thread definition file 27.

The compiler 21 compiles the source program 23 to produce the executable library 24. The compiler 21 is executed by the computer 2 as well as by the management computer 5. The library 22 is a program having a function of collecting the profile information 25 when the executable binary 24 is executed, a function of calculating a parallelization rate, a memory busy rate, the number of floating-point operations, and processing time from the profile information 25, and other functions.

The reassignment program 10 determines, based on a parallelization rate, a memory busy rate, the number of floating-point operations, and processing time, whether or not changing the numbers of threads is effective, and, if it is determined that the changing is effective, outputs the host file 26 and the thread definition file 27. The reassignment program 10 is executed on the management computer 5.

The source program 23 is the source code of a program that is processed in parallel by a plurality of computers 2. The executable binary 24 is an executable program that is produced from the source program 23 by the compiler 21, and is executed in parallel by the plurality of computers 2.

The profile information 25 is information that is collected when the executable binary 24 is executed, and is collected by the hardware monitor 32 or the library 22. From the profile information 25, the parallelization rate, the memory busy rate, the number of floating-point operations of each process, and the processing time of each process are calculated.

FIG. 7 depicts an example of information calculated from the profile information 25. FIG. 7 depicts the parallelization rate, the memory busy rate, the number of floating-point operations of each process, and the processing time of each process of a program for which parallel processing is performed by using four processes. As depicted in FIG. 7, the parallelization rate is 92%. The memory busy rate is 4%.

The number of floating-point operations is 1.19E+10, that is, 11.9 billion for a process with a process number of 0, 2.46E+10 for a process with a process number of 1, and 3.51E+10 for a process with a process number of 2. The number of floating-point operations is 2.19E+10 for a process with a process number of 3.

The processing time is 22 seconds for the process with the process number of 0, 48 seconds for the process with the process number of 1, 70 seconds for the process with the process number of 2, and 44 seconds for the process with the process number of 3.

The host file 26 is a file that stores assignment of processes to the computers 2. The thread definition file 27 is a file that stores assignment of the numbers of threads to processes and assignment of threads to CPU cores.

Figure 8:
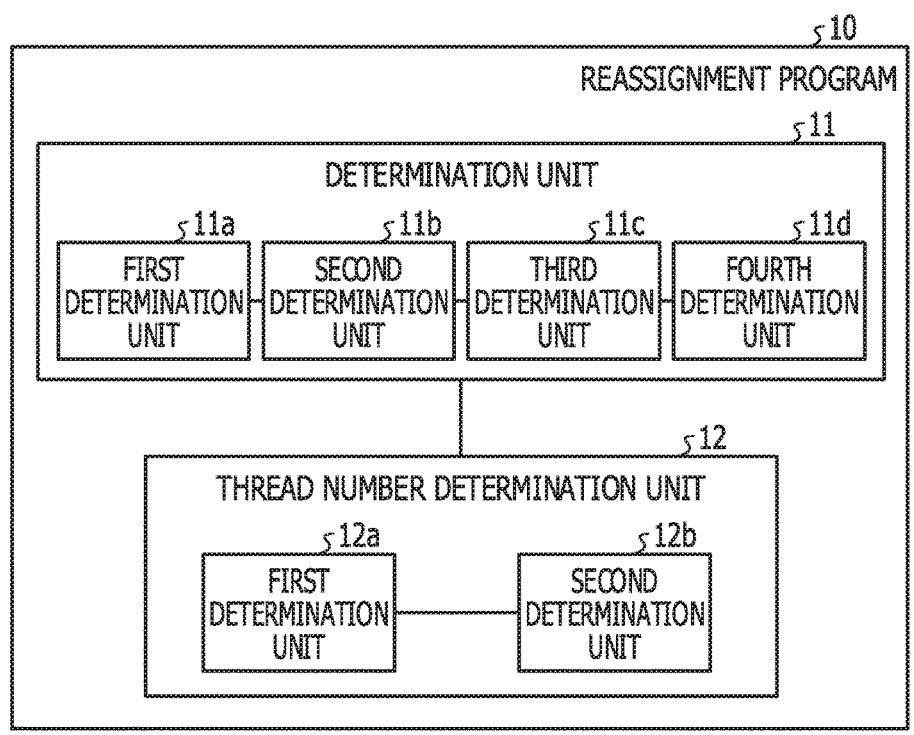
FIG. 8 illustrates a functional configuration of a reassignment program.

Next, the functional configuration of the reassignment program 10 will be described. FIG. 8 illustrates a functional configuration of the reassignment program 10. As illustrated in FIG. 8, the reassignment program 10 includes a determination unit 11 and a thread number determination unit 12.

The determination unit 11 determines whether or not reassignment of the numbers of threads to processes is effective. The determination unit 11 includes a first determination unit 11a, a second determination unit 11b, a third determination unit 11c, and a fourth determination unit 11d.

The first determination unit 11a determines whether or not the parallelization rate is larger than a first threshold. The second determination unit 11b determines whether or not the memory busy rate is smaller than a second threshold. The third determination unit 11c determines whether or not a difference in the number of floating-point operations of each process is larger than a third threshold. Here, the difference in the number of floating-point operations of each process is a difference between the largest number of floating-point operations and the smallest number of floating-point operations. The fourth determination unit 11d determines whether or not the difference in the processing time of each process is larger than a fourth threshold. Here, the difference in the processing time of each process is a difference between the largest processing time and the smallest processing time.

When the parallelization rate is larger than the first threshold, the memory busy rate is smaller than the second threshold, the difference in the number of floating-point operations of each process is larger than the third threshold, and the difference in the processing time of each process is larger than the fourth threshold, the determination unit 11 determines that reassignment of the numbers of threads is effective.

When the determination unit 11 determines that reassignment of the numbers of threads is effective, the thread number determination unit 12 determines the numbers of threads that are assigned to processes. The thread number determination unit 12 includes a first determination unit 12a and a second determination unit 12b.

The first determination unit 12a determines the number of threads of each process so that the processing times of processes are made the same over the entirety of the processes executed on all the computers 2. Specifically, the first determination unit 12a sums "the processing time of each process" to calculate "the sum of processing times of all the processes". Further, the first determination unit 12a calculates "the time rate of each process" from "the processing time of each process" and "the sum of processing times of all the processes", based on the following formula.

"The time rate of each process"="the processing
time of each process"÷the sum of processing
times of all the processes"

Further, the first determination unit 12a calculates "the temporary number of desired threads of each process" (the fractional part of a decimal number is omitted) from "the number of all usable CPU cores (the number of threads)" and "the time rate of each process", based on the following formula. "The temporary number of desired threads of each process"="the number of all usable CPU cores"×"the time rate of each process"

Further, the first determination unit 12a calculates "the number of remaining threads" from "the number of all usable CPU cores" and "the sum of the temporary number of desired threads of each process", based on the following formula.

"The number of remaining threads"="the number of
all usable CPU cores"−"the sum of the tempo-
rary number of desired threads of each process"

Further, if the "number of remaining threads" is zero, the first determination unit 12a determines "the temporary number of desired threads of each process" as "the number of desired threads of each process". In contrast, if the "number of remaining threads" is larger than zero, the first determination unit 12a assigns remaining threads to processes in descending order of the fractional part of a decimal number at the time when "the temporary number of desired threads of each process" is calculated. If the fractional parts of decimal numbers are the same at the time when the last one thread is assigned, the first determination unit 12a assigns the thread to a process with a smaller "temporary number of desired threads of each process", and, if the temporary numbers are also the same, assigns it to a process with a smaller process number. Further, the first determination unit 12a determines the number of assigned threads as "the number of desired threads of each process".

When the sum of the numbers of threads assigned to the computer 2 is the same as the number of CPU cores per computer 2, the first determination unit 12a does not change processes that are assigned to that computer 2. FIG. 9A illustrates an example in which processes that are assigned to the computers 2 are not changed. In FIG. 9A, each of the computers 2 represented as a computer #0 and a computer #1 includes eight cores 31. Before reassignment, four threads are assigned to each of a process #00 and a process #01, which run on the computer #0, and four threads are assigned to each of a process #10 and a process #11, which run on the computer #1.

Further, after reassignment of the numbers of threads, it is assumed that six threads are assigned to the process #00, and two threads are assigned to the process #01. In this case, the sum of the numbers of threads assigned to the computer #0 is eight, which is the same as the number of CPU cores per computer 2. Accordingly, the first determination unit 12a does not change processes that are assigned to the computer #0. After reassignment of the numbers of threads, it is also assumed that five threads are assigned to the process #10, and three threads are assigned to the process #11. In this case, the sum of the numbers of threads assigned to the computer #1 is eight, which is the same as the number of CPU cores per computer 2. Accordingly, the first determination unit 12a does not change processes that are assigned to the computer #1.

In contrast, FIG. 9B illustrates an example in which processes that are assigned to the computers 2 are changed. In FIG. 9B, before reassignment, four threads are assigned to each of the process #00 and the process #01, which run on the computer #0, and four threads are assigned to each of the process #10 and the process #11, which run on the computer #1.

After reassignment of the numbers of threads, six threads are assigned to the process #00, four threads are assigned to the process #01, four threads are assigned to the process #10, and two threads are assigned to the process #11. In this case, the sum of the numbers of threads assigned to the computer #0 is 10, which is greater than the number of CPU cores per computer 2. Accordingly, the first determination unit 12a changes a process that is assigned to the computer #0.

That is, the first determination unit 12a assigns the process #00 and the process #11 to the computer #0 and assigns the process #10 and the process #01 to the computer #1, and the sum of the numbers of threads assigned to each of the computer #0 and the computer #1 is eight.

In such a way, when there is a computer 2 in which the sum of the numbers of threads assigned to the computer 2 is different from the number of CPU cores per computer 2, the first determination unit 12a sets again a process that is assigned to the computer 2. Specifically, the first determination unit 12a sorts processes in descending order using "the number of desired threads of each process" and "the process number". Further, the first determination unit 12a combines processes sequentially from top or bottom so that the sum of "the number of desired threads of each process" equals "the number of threads per computer". Further, if, in all the computers 2, the sum of "the number of desired threads of each process" equals "the number of threads per computer", the first determination unit 12a completes the processing. On the other hand, if, in any computer 2, the sum of "the number of desired threads of each process" does not equal "the number of threads per computer", the first determination unit 12a does not determine the number of threads of each process, but the second determination unit 12b determines the number of threads of each process.

The second determination unit 12b determines the number of threads of each process so that, for each computer 2, the processing times of processes in the computer 2 are made the same. Specifically, the second determination unit 12b performs the following processing for each computer 2. First, the second determination unit 12b sums "the processing time of each process" to obtain "the sum of processing times in the computer 2". Further, the second determination unit 12b calculates "the time rate of each process" from "the processing time of each process" and "the sum of processing times in the computer 2".

Further, based on the number of CPU cores per computer 2, the second determination unit 12b calculates "the temporary number of desired threads of each process" (the fractional part of a decimal number is omitted) from "the time rate of each process". Further, the second determination unit 12b subtracts the sum of "the temporary number of desired threads of each process" from "the number of CPU cores per computer 2" to obtain "the number of remaining threads".

Further, if "the number of remaining threads" is zero, the second determination unit 12b determines "the temporary number of desired threads of each process" as "the number of desired threads of each process". On the other hand, if "the number of remaining threads" is larger than zero, the second determination unit 12b assigns the remaining threads in descending order of the fractional part of a decimal number at the time when "the temporary number of desired threads of each process" is calculated. If the fractional parts of decimal numbers are the same at the time when the last one thread is assigned, the second determination unit 12b assigns this thread to a process with a smaller temporary number of desired threads, and, if the temporary numbers of desired threads are also the same, assigns it to a process with a smaller "process number". Further, the second determination unit 12b determines the assigned number of threads as "the number of desired threads of each process".

Next, the flow of a process of the reassignment program 10 will be described. FIG. 10 is a flowchart illustrating the flow of a process of the reassignment program 10. As illustrated in FIG. 10, the reassignment program 10 obtains a parallelization rate, a memory busy rate, the number of floating-point operations, and the processing time calculated from the profile information 25 (step S11).

The reassignment program 10 then determines whether or not the parallelization rate is larger than the first threshold (step S12), and completes the process if the parallelization rate is not larger. However, if larger, then the reassignment program 10 determines whether or not the memory busy rate is smaller than the second threshold (step S13).

Then, if the memory busy rate is not smaller than the second threshold, the reassignment program 10 completes the process. However, if smaller, then the reassignment program 10 determines whether or not a difference in the number of floating-point operations of each process is larger than the third threshold (step S14).

Then, if the difference in the number of floating-point operations of each process is not larger than the third threshold, the reassignment program 10 completes the process. However, if larger, then the reassignment program 10 determines whether or not the difference in the processing time of each process is larger than the fourth threshold (step S15).

Then, if the difference in the processing time of each process is not larger than the fourth threshold, the reassignment program 10 completes the process. On the other hand, if larger, then the reassignment program 10 determines the number of threads of each process (step S16) and outputs the host file 26 and the thread definition file 27 (step S17).

In this way, the reassignment program 10 determines the effectiveness of reassignment of the number of threads based on the parallelization rate, the memory busy rate, the number of floating-point operations, and the processing time, and thus ineffective changes in the number of threads are removed.

Figure 11:
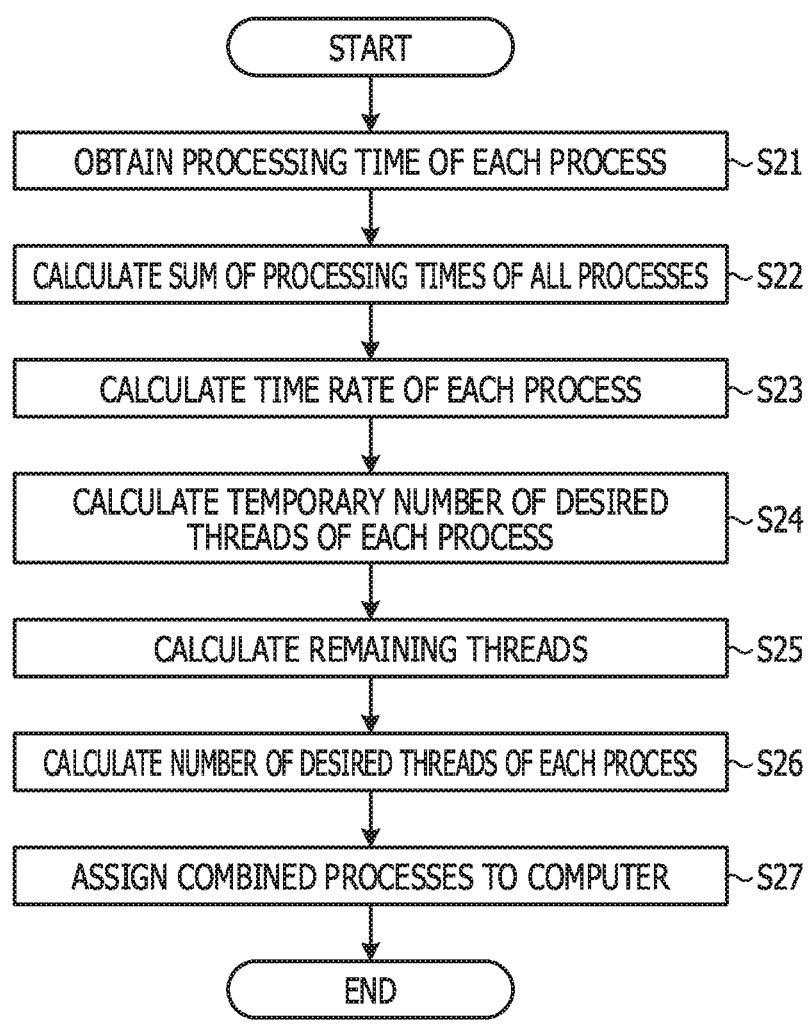
FIG. 11 is a flowchart illustrating a flow of a thread number determination process performed by a first determination unit.

Next, the flow of a thread number determination process performed by the first determination unit 12a will be described. FIG. 11 is a flowchart illustrating the flow of the thread number determination process performed by the first determination unit 12a. As illustrated in FIG. 11, the first determination unit 12a obtains the processing time of each process (step S21).

The first determination unit 12a then calculates the sum of processing times of all the processes (step S22) and calculates the time rate of each process (step S23). Then, the first determination unit 12a calculates the temporary number of desired threads of each process (step S24) and calculates remaining threads (step S25). Then, the first determination unit 12a calculates the number of desired threads of each process (step S26) and assigns combined processes to the computer 2 (step S27).

In this way, the first determination unit 12a makes the processing times of all the processes the same, thereby reducing the processing time of the program.

Next, the flow of a thread number determination process performed by the second determination unit 12b will be described. FIG. 12 is a flowchart illustrating the flow of the thread number determination process performed by the second determination unit 12b. As illustrated in FIG. 12, the second determination unit 12b obtains the processing time of each process (step S31) and sets a target computer number to zero (step S32).

The second determination unit 12b then determines whether or not the target computer number is smaller than the number of all the computers (step S33), and, if not smaller, completes the process. However, if smaller, the second determination unit 12b calculates the sum of processing times of processes in a target computer 2 (step S34).

The second determination unit 12b then calculates the time rate of each process (step S36), calculates the temporary number of desired threads of each process (step S36), and calculates the number of remaining threads (step S37). Then, the second determination unit 12b calculates the number of desired threads of each process (step S38), adds one to the target computer number (step S39), and returns to step S33.

In this way, the second determination unit 12b makes the processing times of processes the same in each computer 2, thereby reducing the processing time of the program.

As described above, in the embodiment, the first determination unit 11a determines whether or not the parallelization rate is larger than the first threshold, and the second determination unit 11b determines whether or not the memory busy rate is smaller than the second threshold. Further, the third determination unit 11c determines whether or not the difference in the number of floating-point operations of each process is larger than the third threshold, and the fourth determination unit 11d determines whether or not the difference in the processing time of each process is larger than the fourth threshold. Further, when the parallelization rate is larger than the first threshold, the memory busy rate is smaller than the second threshold, the difference in the number of floating-point operations of each process is larger than the third threshold, and the difference in the processing time of each process is larger than the fourth threshold, the determination unit 11 determines that reassignment of the numbers of threads is effective. Accordingly, the reassignment program 10 may remove ineffective changes in the number of threads.

Additionally, in the embodiment, the first determination unit 12a determines the number of threads of each process so that the processing times are made the same over all the processes, and thus the processing time of the program is reduced.

Additionally, in the embodiment, the second determination unit 12b determines the number of threads of each process so that the processing times of processes are made the same in each computer 2, and thus the processing time of the program is reduced.

Additionally, in the embodiment, the first determination unit 11a uses a parallelization rate calculated based on the total amount of time spent for parallel processing of all threads/(the total amount of time spent for parallel processing of all threads+the amount of time spent for sequential processing of a master thread). Accordingly, the first determination unit 11a accurately determines whether or not the parallelization of the program is high.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A system comprising:
a plurality of computers configured to process a computer program in parallel by executing a plurality of processes, respectively, in parallel, each process of the plurality of processes including at least one thread, and each of the plurality of computers including a first memory and a first processor coupled to the first memory and configured to execute the plurality of processes, respectively; and
a management device configured to control the plurality of computers, the control device including a second memory, and a second processor coupled to the second memory and configured to:
calculate a parallelization rate indicating a level of thread parallelization when the plurality of processes are executed in parallel by the plurality of computers, respectively,
calculate a memory busy rate indicating a percentage of an amount of time during which the first memory of each of the plurality of computers is used when the plurality of processes are executed in parallel by the plurality of computers, respectively,
calculate an operation number difference indicating a difference in a number of floating-point operations of each process of the plurality of processes,
calculate a processing time difference indicating a difference in processing time in each process of the plurality of processes, and
based on the calculated parallelization rate, the calculated memory busy rate, the calculated operation number difference and the calculated processing time difference, execute an adjusting of a number of the threads included in at least one process of the plurality of processes, respectively.

2. The system according to claim 1, wherein the second processor is configured to execute the adjusting of the number of the threads included in at least one process of the plurality of processes when the calculated parallelization rate is larger than a first threshold, the calculated memory busy rate is smaller than a second threshold, the calculated operation number difference is larger than a third threshold, and the calculated processing time difference is larger than a fourth threshold.

3. The system according to claim 1, wherein the second processor is further configured to:
adjust assignment of the plurality of processes to the plurality of computers, respectively.

4. The system according to claim 3, wherein
the first processor included in each of the plurality of computers includes one or more cores respectively, and
the second processor is further configured to:
when not able to adjust assignment of the plurality of processes to the plurality of computers, respectively, because of a constraint in a number of the cores, execute the adjusting of the number of the threads included in at least one process of the plurality of processes, respectively.

5. The system according to claim 1, wherein
the parallelization rate is calculated based on a percentage of an amount of time over which the plurality of processes are performed in parallel, to an amount of processing time of the plurality of processes.

6. A management device to control a plurality of computers, each of the plurality of computers configured to process a computer program in parallel by executing a plurality of processes, respectively, in parallel, each process of the plurality of processes including at least one thread, and each of the plurality of computers including a first memory and a first processor coupled to the first memory to execute the plurality of processes, respectively, the management device comprising:
a second memory; and
a second processor coupled to the second memory and configured to:
calculate a parallelization rate indicating a level of thread parallelization when the plurality of processes are executed in parallel by the plurality of computers, respectively,
calculate a memory busy rate indicating a percentage of an amount of time during which the first memory of each of the plurality of computers is used when the plurality of processes are executed in parallel by the plurality of computers, respectively,
calculate an operation number difference indicating a difference in a number of floating-point operations of each process of the plurality of processes,
calculate a processing time difference indicating a difference in processing time in each process of the plurality of processes, and
based on the calculated parallelization rate, the calculated memory busy rate, the calculated operation number difference and the calculated processing time difference, execute an adjusting of a number of the threads included in at least one process of the plurality of processes, respectively.

7. The management device according to claim 6, wherein the second processor is configured to execute the adjusting of the number of the threads included in at least one process of the plurality of processes when the calculated parallelization rate is larger than a first threshold, the calculated memory busy rate is smaller than a second threshold, the calculated operation number difference is larger than a third threshold, and the calculated processing time difference is larger than a fourth threshold.

8. The management device according to claim 6, wherein the second processor is further configured to:
adjust assignment of the plurality of processes to the plurality of computers, respectively.

9. The management device according to claim 8, wherein the first processor included in each of the plurality of computers includes one or more cores respectively, and the second processor is further configured to:
when not able to adjust assignment of the plurality of processes to the plurality of computers, respectively, because of a constraint in a number of the cores, execute the adjusting of the number of the threads included in at least one process of the plurality of processes, respectively.

10. The management device according to claim 6, wherein
the parallelization rate is calculated based on a percentage of an amount of time over which the plurality of processes are performed in parallel, to an amount of processing time of the plurality of processes.

11. A method of controlling a plurality of computers configured to process a computer program in parallel by executing a plurality of processes, respectively, in parallel, each process of the plurality of processes including at least one thread, and each of the plurality of computers including a memory and a processor to execute the plurality of processes, respectively, the method comprising:
calculating a parallelization rate indicating a level of thread parallelization when the plurality of processes are executed in parallel by the plurality of computers, respectively;
calculating a memory busy rate indicating a percentage of an amount of time during which the memory of each of the plurality of computers is used when the plurality of processes are executed in parallel by the plurality of computers, respectively;
calculating an operation number difference indicating a difference in a number of floating-point operations of each process of the plurality of processes;
calculating a processing time difference indicating a difference in processing time in each process of the plurality of processes; and
based on the calculated parallelization rate, the calculated memory busy rate, the calculated operation number difference and the calculated processing time difference, executing an adjusting of a number of the threads included in at least one process of the plurality of processes, respectively.

12. The method according to claim 11, wherein the executing the adjusting of the number of the threads included in at least one process of the plurality of processes is executed when the calculated parallelization rate is larger than a first threshold, the calculated memory busy rate is smaller than a second threshold, the calculated operation number difference is larger than a third threshold, and the calculated processing time difference is larger than a fourth threshold.

13. The method according to claim 11, further comprising:
adjusting assignment of the plurality of processes to the plurality of computers, respectively.

14. The method according to claim 13, wherein
the processor included in each of the plurality of computers includes one or more cores respectively, and
the method further comprising:
when not able to adjust assignment of the plurality of processes to the plurality of computers, respectively, because of a constraint in a number of the cores, executing the adjusting of the number of the threads included in at least one process of the plurality of processes, respectively.

15. The method according to claim 11, wherein
the parallelization rate is calculated based on a percentage of an amount of time over which the plurality of processes are performed in parallel, to an amount of processing time of the plurality of processes.

* * * * *